Patented July 18, 1933

1,918,671

UNITED STATES PATENT OFFICE

DAVID SPENCE, OF FOREST HILLS, NEW YORK, ASSIGNOR TO INTERCONTINENTAL RUBBER COMPANY, OF NEW YORK, N. Y., A CORPORATION OF DELAWARE

RUBBER

No Drawing.    Application filed March 17, 1928.  Serial No. 262,603.

This invention relates to improvements in the production of rubber, and includes an improved process of treating guayule and similar shrub and of extracting rubber therefrom, and improved guayule rubber and other products.

Various methods have been proposed for the extraction of rubber from the guayule shrub. Among these proposals is the extraction of the rubber from the shrub by means of solvents, but such solvent extraction, though not impossible, is too expensive in comparison with extraction by mechanical means. It was found at an early stage in the history of guayule production that the extraction of the rubber from this shrub could best be accomplished by a simple mechanical operation of crushing and macerating the shrub in presence of water under conditions whereby the fine particles of rubber in the cell structure of the plant are agglomerated into larger particles which can be separated and collected by flotation from water. This mechanical method of extraction has been the one adopted and commercially employed.

In the course of the many years' experience in the commercial employment of this mechanical extraction process there has been developed a more or less standard practice in the handling of the shrub after harvesting and before milling, and this standard practice is followed in the handling of the shrub. Thus it is that we find in Mexico, in the regions where the shrub abounds, shrub centers where the shrub, immediately after it is pulled from the ground, is spread out and allowed to dry out quickly and partially while exposed to the sun before the shrub is baled and transported to the factory for extraction.

The purpose of this immediate sunning and drying of the shrub is in part to avoid the transportation of superfluous water and leaves which are known to contain little or no rubber and in part because experience has taught that the milling of shrub which has not been subjected to such sunning or drying results in low quality and poor yields of recoverable rubber, the belief being prevalent that such sunning treatment results in the production of rubber substance by the plant.

The period of sunning or drying of the freshly pulled shrub varies from time to time and from place to place, but the disastrous effect on quality and yield of milling shrub without such preliminary drying was early recognized and the policy of sunning or drying out of the shrub before milling generally adopted. In instances where sunning and drying was not adopted, the shrub on arrival at the factory was found to be covered with mildew and was claimed to produce a very poor quality of rubber, which the immediate sunning or drying out of the shrub after gathering prevented.

Thus we find in the guayule industry today such expressions as "prime condition", "oversunned" and "under-sunned" as applied to the shrub as it appears for milling, these terms being the outcome of accepted and adopted practice in the present art of shrub treatment before milling; and the endeavor is to subject all shrubs gathered to a rapid drying out or desiccation process immediately after gathering to convert the shrub into a condition as nearly as possible that which will represent "prime condition".

In this rapid drying out or desiccation process, the moisture content of the shrub is quickly reduced and the plants as they arrive at the factory will not ordinarily contain more than about 15% of moisture on the total weight of the shrub. In the dry season, and on account of delays in transportation or in storage, it is not uncommon to find shrub with not over 10% of moisture at time of milling. Shrub gathered in the rainy season which has become wet has been looked upon as more or less ruined, and special efforts are made to dry out such shrub as quickly as possible.

Thus it is that we find in Mexico today only more or less completely dried out shrub entering into milling practice. On the average, around 25 to 35 days will elapse between the time of gathering of the shrub and the time of milling, during which time a further desiccation of the plant takes place supplementing the rapid drying out or desiccation process to which the shrub is subjected immediately after gathering.

In the subsequent treatment of the shrub to recover the rubber therefrom by mechanical extraction, the dried out material is crushed between rolls in the presence of water, and the crushed material is fed continuously and immediately to ball mills or continuous feed tube mills where the crushed mass is ground in presence of water by the action of flint pebbles. The rubber present in the plant is agglomerated by the rubbing action of the pebbles into small particles or pellets known as "worms" which are subsequently recovered by flotation on water, while the bulk of the fibre and other impurities sinks and can readily be separated. The rubber "worms" are skimmed off from the surface of the settling tank and further purified before drying. Current commercial practice calls for practically immediate milling of the shrub after crushing. It is considered that the keeping of the crushed shrub in its moist condition over-night before milling is disastrous both to the quality and yield of rubber, and it is accordingly the established rule to crush no more shrub in a day than the mills can extract that day.

It is a well recognized fact that the rubber produced by the mechanical extraction method above described and universally employed for guayule extraction varies greatly, not only in yield, but particularly in quality and composition. Variations occur with the condition of the weather and the season of the year during which the shrub is harvested, as well as with the degree of desiccation or the age of the shrub between gathering and milling. Even with shrub in so-called "prime condition" for milling, as above explained, variations occcur as to yield and especially as to composition and quality of the resulting rubber product. No satisfactory explanation has been offered, nor has any process heretobefore been suggested to overcome these variations in a practical manner.

As illustrative of the variations met with in guayule rubber as heretofore produced, tests made over a long period of time and on hundreds of samples of commercial guayule rubber prepared by current practice show, for example, that the so-called acetone soluble extract of this material will vary in an uncontrolled and undefined way from around 20% or less up to around 32% or more, the usual figure for the acetone extract of commercial guayule rubber being about 25 to 27% of the weight of the dry rubber Similar variations occur in the physical properties of the guayule rubber as currently produced. Different samples of guayule rubber as currently produced will show variations of as much as 50% or more in physical quality. For example, using a standard test formula containing 100 parts rubber, 8 parts zinc oxide, 6 parts sulfur, 1.5 parts stearic acid, and 0.5 part diphenyl- guanidine, it is seldom possible to obtain a tensile strength on the vlucanized product in excess of 2000 pounds per square inch with an elongation of 850%. An average of several hundred physical tests made on guayule rubber as currently produced from shrub gathered from the various guayule-producing districts of northern Mexico has showed a tensile strength of between 1800 and 2000 pounds per square inch with an elongation of about 850% on the above standard formula. Such comparatively poor tensile strength, combined with the extreme variations in vulcanized quality of guayule rubber, are well known and have resulted in a comparatively limited use for the material which has found its way in small amounts into manufacturing formulæ more as a softener than as a substitute or equivalent for plantation rubber.

The use of guayule rubber today is practically confined to compounds where its softness and stickiness and price make it a desirable flux for the higher grade rubbers, or where these same properties make it a suitable material when used in small amount together with high grade rubber for fricton purposes.

No satisfactory explanation has been offered, so far as I am aware, for these enormous variations in the properties of guayule rubber; nor has any practical means been heretofore found, so far as I am aware, either of improving the physical quality of guayule rubber in vulcanization or of overcoming these well known variations in physical quality of commercial guayule rubber at the present time. The inferiority of present day guayule rubber has been attributed to the very high content of acetone-soluble impurities present in it, and it has been proposed to extract the rubber with acetone to reduce the acetone extract of the rubber to an extent which would make it possible to use the rubber in larger quantities in manufacturing formulæ. Such extraction, however, is too expensive for use except when the commercial price of rubber is very high.

It has also been proposed to subject present day guayule rubber to digestion with boiling solutions of caustic alkali and the like to improve its quality, but while such treatment may bring about a reduction in the acetone-soluble content of the rubber, it does not give a high grade rubber of uniform vulcanizing quality, and the treated product is prone to deterioration, becoming soft and sticky in storage, and it has not found favor with manufacturers so that such treatment has been practically abandoned. The expense of such treatment with strong solutions of caustic alkali is furthermore prohibitive with the present price of plantation rubber.

Thus it is that commercial guayule rubber as we find it today is considered an inferior rubber product, lacking in uniformity of composition and properties and vulcanizing quality, and a product which cannot be compared with and which cannot compete with plantation rubber as a substitute therefor, except to a limited extent and for special purposes.

The present invention provides an improved process for the treatment of guayule shrub and the extraction of rubber therefrom whereby a guayule product is obtained of a high degree of uniformity and with such improved vulcanizing and other properties that it forms a valuable substitute for plantation rubber, being comparable with plantation rubber in its properties and in some respects being superior thereto.

My investigations have shown that much of the current belief regarding the occurrence in the extraction of rubber from guayule shrub and the proper methods of handling the shrub are wrong. For example, it is generally believed that the rubber in guayule shrub is laid down in the plant in the form in which it is subsequently isolated, and that the extraction of the rubber from the shrub involves entirely different principles of operation from those applicable to the recovery of rubber from Hevea latex. My investigations indicate, however, that the rubber is present in the guayule shrub in the form of a colloidal suspension in the plant juices and that the rubber is susceptible to coagulation much as rubber is coagulated from latex; and my investigations indicate that it is of primary importance to obtain effective and correct coagulation of the rubber in guayule shrub if the maximum yield and quality of rubber is to be obtained. If the rubber is not completely and correctly coagulated, loss of yield and quality of rubber on extraction will occur. My investigations indicate further that the common practice, which is considered to be necessary, of rapidly drying the shrub after gathering and maintaining the shrub in a dry condition until milled, and of then milling the wet shrub immediately after crushing, is largely responsible for the poor quality and extreme variability in present day commercial guayule rubber products.

I have found that if the guayule shrub, instead of being dried and kept dry until milled, is kept in a wet condition, properly regulated, before it is subjected to milling, far-reaching changes take place in the shrub, due to natural agencies, which make it possible to recover an unusually high grade and uniform rubber product from the resulting shrub.

I have found that when guayule shrub is kept wet and exposed to the air in a wet state, under regulated conditions, a far-reaching decomposition takes place in part of the organic constituents of the shrub, and particularly in those constituents intimately associated with the rubber in the shrub, such that the subsequent milling of the rubber from the treated shrub is greatly facilitated, and a radically improved rubber product obtained.

I have found that when guayule shrub is kept wet under regulated conditions the shrub undergoes a change, due to enzymes or bacteria or molds or similar agents present in or developed in the shrub, such that a large part of the organic matter which is present in a water insoluble condition in the shrub is decomposed or converted into a water soluble condition such that it can be readily washed or extracted from the shrub during the subsequent milling operation. Ordinary guayule shrub contains about 10% of water soluble and extractable material, based on the dry shrub. The woody fibre and pith of the shrub contains practically no rubber and amounts to somewhere around 45% of the total shrub. The rubber content of the shrub, on a dry basis, varies, for example, from around 10% up to about 15%. I have found that as much as 15 to 20% of the total weight of the shrub can be decomposed or converted from a water insoluble condition to a water soluble condition by subjecting the shrub to a regulated decomposition through natural agencies, such as those above referred to.

The treatment to which I subject the shrub, in the process of the present invention, is a process which I will refer to as a "retting" process, for lack of a better term, and because it seems to have some analogy to the common retting process of treating flax for the production of linen fibres. In referring to the process of the present invention as a retting process, I use the term therefor not in its ordinary sense as applied to flax retting, but as designating the process of decomposition to which I subject guayule shrub for the purpose of decomposing or converting a large part of the total weight of the shrub, from a water insoluble to a water soluble condition.

As a result of this radical and far-reaching decomposition of a large part of the non-fibrous organic matter present in the shrub, and the subsequent removal of the resulting water soluble constituents on milling, a large part of the organic substances present in ordinary guayule shrub as milled are removed and prevented from being mechanically occluded or included in the rubber during its agglomeration process. This retting operation, moreover, appears to decompose and render water soluble constituents which, unless so removed, are present as objectionable constituents in the acetone-soluble and benzol-insoluble portion of guayule rubber. In addition, the retting process appears to decompose other organic constituents such, for example, as the vegetable proteins, into decomposition products which are desirable additions to the rubber and which, when produced, are of value in imparting improved properties to the rubber.

My investigations of the acetone-soluble extract and of the benzol-insoluble extract of ordinary commercial guayule rubber indicate that they contain a considerable amount of material of a carbohydrate character which seems particularly objectionable and which appears to be largely responsible for variations in commercial guayule rubber and for its inferior properties. These objectionable carbohydrate impurities appear to be decomposed by the retting treatment and converted partly into water soluble substances which are washed from the shrub during the milling operation and thereby eliminated so that they are not present in the resulting rubber.

In addition, the retting process appears to decompose nitrogenous or protein constituents of the shrub and to convert them into decomposition products of a desirable character, part of which appear to be absorbed by or included with the rubber when extracted from the retted shrub, and which appear to be valuable for imparting to the resulting rubber its improved and valuable properties.

The retting process of the present invention appears to be a fermentation or hydrolysis process, brought about by natural ferments or enzymes or other agents present in the shrub, which act upon the insoluble materials of a carbohydrate and protein character to hydrolyze them or convert them into decomposition products or hydrolysis products of a water soluble character, or in part of a water soluble character; the nature of the retting process indicates that the decomposition of sugars ordinarily takes place first, since the first part of the process is an acid fermentation, in which carbon dioxide is given off, and that subsequently decomposition of proteins or nitrogenous materials takes place, since this latter part of the operation partakes of the character of putrefactive decomposition.

I am led to believe, by the results which I have obtained in the retting of guayule shrub, that the decomposition of such a large portion of the organic matter intimately associated with the rubber brings about a fundamental change in the colloidal condition of the rubber and in the organic constituents of the plant immediately associated with the rubber; and that this profound change in the non-rubber constituents associated with the rubber has a beneficial effect both in removing objectionable non-rubber constituents by converting them into a water soluble state, and by converting protein constituents into desirable decomposition products which are absorbed by or combined with the extracted rubber.

The retting process of the present invention also has a beneficial effect in coagulating the rubber present in the shrub. This coagulation appears to be materially promoted and facilitated by the conversion of insoluble organic matter into soluble organic matter, with resulting change in the medium in which the uncoagulated rubber is dispersed, and with the production of acids or other agents which appear to promote and bring about effective coagulation of uncoagulated rubber in the shrub.

The retting treatment of the shrub has important advantages in the subsequent milling operation. The conversion of a large part of the normally water insoluble constituents of the shrub into water soluble constituents results in a radical increase in the extraction of organic matter from the shrub during milling, and leaves the rubber in a greatly concentrated state in the non-fibrous portions of the shrub, such that it is much more readily milled from the shrub and requires less grinding in the pebble mill to effect the agglomeration and extraction of the rubber. The time of milling can thus be materially reduced, and the output of a mill of given size correspondingly increased.

The retting process of the present invention will vary somewhat with the conditions of the shrub, but it is of value for treating shrubs which vary greatly in their condition. Freshly gathered shrub, and particularly lush shrub, which contains naturally a fairly high water content, for example, around 50 to 60%, can advantageously be treated directly without subjecting it to the rapid drying and sunning to which it is ordinarily subjected. Shrub which has been gathered and stored requires to be moistened again by wetting or soaking with water in order to bring about the desired retting changes. The retting treatment can be carried out with the shrub in an uncrushed condition, but it is more advantageously carried out on crushed shrub. In general, the retting process of the invention involves keeping the shrub wet, while it is still in a lush or freshly gathered condition containing sufficient water, or wetting the shrub where it has been dried or contains too little water, and keeping the shrub wet and exposed to the air for a sufficient period of time, usually several days, until the retting process has progressed sufficiently to bring about the far-reaching changes in the shrub above referred to.

For best results, the shrub which is subjected to retting should be freshly gathered, or, in the case of shrub which has been gathered some time before retting, it should be protected against objectionable decomposition as much as possible before it is subjected to retting treatment. The shrub can advantageously be preserved as described more fully in my prior application Serial No. 107,830.

Where the shrub is gathered at some distance from the mill and is delayed in transit or must be stored before milling, it should be protected against objectionable decomposition as much as possible, for example, by rapid sunning or drying to give what is known as prime shrub so that it will reach the mill without too great deterioration of the rubber. However, even shrub which has undergone objectionable decomposition, and which would ordinarily give low grade rubber, can be improved in the quality of the rubber produced therefrom by subjecting it to the retting treatment.

With previously dried shrub, the shrub should be moistened by soaking in water or by spraying in water until it becomes sufficiently wet or moist to promote the retting process. The whole shrub can be soaked in water to wet it without crushing, but a longer time is required. When the shrub is retted without crushing it may be spread out on the ground and wet down with water or soaked in a tank and then removed from the tank, and then spread out on the ground where it is exposed to the air. It is kept wet by sprinkling it or wetting it down from time to time, for example, daily. By thus exposing the shrub in a wet condition to the air, and keeping the shrub wet, the natural processes of decomposition of organic matter which I refer to as retting take place progressively.

This retting process can be followed from day to day by taking samples of the shrub and milling them and testing the extracted rubber. The improvement in quality of the rubber is progressive, until it reaches a maximum, after which no further improvement appears to take place, and the further continuation of the retting process may be harmful, unless the rubber is protected, e. g. by the addition of preservatives.

The retting process can be carried out more advantageously on crushed shrub. The shrub may be crushed in the ordinary way by crusher rolls in the presence of water, but instead of milling the crushed shrub immediately, as is common practice and as is generally considered necessary, I keep the crushed shrub in a wet condition, wetting it down from time to time as may be needed, until the retting process has progressed to the required extent, as indicated by experience or by tests from time to time of the retted shrub by milling and extracting samples of it.

When the shrub is crushed in the presence of water, opportunity is provided for the natural enzymes or ferments or other agents of the shrub responsible for the retting to distribute themselves throughout the crushed shrub, while the water can more readily penetrate the crushed shrub, thus promoting the retting operation.

A convenient way of carrying out the retting process is to crush the shrub and spread the crushed shrub out on the ground in piles and wet the piles down daily or as often as may be required. This keeps the shrub wet and exposed to the air and promotes the retting process, which can be stopped when experience or tests indicate the process has progressed sufficiently.

The retted shrub can then be milled immediately, using ordinary mills, or it can be stored for varying periods of time in silos or storage containers from which excess of fresh air is excluded. The retting process can also be carried out in silos or storage containers in which the shrub is kept wet, and to which fresh air is admitted to sweep out gases formed by the retting process. After the shrub has been dried by sunning the rubber content is largely or completely coagulated. In case part of the rubber is uncoagulated, the acid formed during the first part of the retting process acts as a coagulating agent and assists in the coagulation of the rubber.

Where the mill is located in proximity to the supply of shrub to be milled, so that the shrub can be freshly gathered and transported to the mill immediately, it can advantageously be subjected to retting in its freshly gathered condition. The whole shrub, or the partly broken shrub, or the crushed freshly gathered shrub, may be subjected to retting in piles on the ground or in bales or by spreading out the crushed material on the floor or in suitable bins for that purpose, and preventing the moist fresh shrub from drying out, or moistening the shrub if needed, to promote the retting process.

The time required to complete the process of retting depends somewhat on the condition of the shrub. Green or lush shrub will ret more quickly than the same material after sunning and drying. Shrub crushed in presence of water rets more quickly than the same material uncrushed and in bale form. So also, the crushed shrub will ret more quickly when spread on the floor in shallow piles than when packed in bins or silos. The condition of the retting liquor, for example, the water in which the shrub is soaked or crushed, also influences the retting process and the time required. The liquor may have added to it suitable reagents, such as lime, for example, or urea, or cyanamid, which will promote or modify the retting process, or the liquor may have added to it cultures of certain bacteria to promote and shorten the retting process. Extracts from retted shrub can be employed with water for wetting additional shrubs thus promoting the inoculation of the shrub undergoing retting with active retting agents from previous operations. The temperature of the retting operation also influences the retting time, it being desirable to maintain a uniform temperature of not less than about 30° C. during the retting operation. Access of air during the retting operation also seems to be advantageous in shortening the time of retting.

Where the shrub before retting must be stored and kept, or where the retted shrub must be kept for some time after retting and before milling, the shrub can advantageously be treated with stabilizing or preserving agents, for example, as described in my prior application above referred to. The addition of a small amount of such an agent, such as for example, para-amino-dimethyl-aniline, will preserve the rubber in the shrub against objectionable deterioration for considerable periods of time, without interfering with the retting of the shrub so treated.

Fresh shrub contains the rubber in the form of a colloidal suspension in the plant juices. The rubber must be coagulated before the milling operation. When fresh shrub is subjected to retting, the retting operation itself causes effective coagulation of the rubber, due apparently to acids generated during the retting process, which act as coagulating mediums upon the rubber. The retting of the shrub containing the uncoagulated rubber subjects the organic colloidal medium in which the rubber is suspended to the decomposing action of the retting process, so that the retting process apparently serves not only to coagulate the rubber, but to remove from the colloidal suspending medium, those substances which otherwise would interfere with the effective coagulation or would tend to be included in the coagulated rubber.

It is important that the shrub subjected to milling should have the rubber completely coagulated therein, in order to avoid loss, during milling. If the retting process does not accomplish sufficiently complete coagulation the shrub can be treated to supplemental coagulating agents. It can, for example, be immersed in boiling water for a sufficient time to complete the coagulation.

The retted shrub with its rubber coagulated and with a large part of the normally insoluble constituents thereof rendered water soluble by the retting, is subjected to milling for the extraction of the rubber from the retted shrub. If the shrub is retted in an uncrushed state, it must be first crushed and then milled. If the shrub is crushed before retting, the retted shrub can be fed directly to the mills for the extraction of the rubber therefrom.

The same or similar mills can be employed for extracting the rubber from the retted shrub that are commonly employed for the extraction of rubber from ordinary shrub. These mills contain flint pebbles and revolve slowly on a horizontal axis. Their action on the shrub depends on the rolling motion of the pebbles in the presence of water and results in a further disintegration of the fibre and the agglomeration of the rubber into small particles which vary in size and which rise to the surface of the settling tank into which the liquor from the tube mills is run, and are skimmed off and collected. The retted shrub can be supplied to the mills with additional water, as in present practice, and the water and shrub removed from the mill in the same or a similar manner.

The milling operation is, however, modified in important respects from the ordinary milling process. Instead of containing only 10% or somewhat more of water soluble material normally contained in the shrub, the retted shrub may contain additional water soluble material, rendered soluble by the decomposition or hydrolysis taking place during the retting treatment. The retting process furthermore decomposed intercellular materials and loosens up the fibres so that the plant is much more easily disintegrated on milling. Sufficient water should be supplied during the milling operation to insure the extraction of the greatly increased amount of soluble material from the shrub. The fibrous material remaining after the milling operation is an improved bagasse, from which most of the rubber and water soluble constituents, including those produced by the retting process, have been removed.

The rendering water soluble, and the extraction, of a large part of the non-rubber organic constituents of the shrub results in the removal from that part of the shrub in which the rubber is concentrated of a large part of the organic matter intimately associated with the rubber in the unretted shrub. The rubber concentration is thereby effectively increased, and the milling of the rubber and the agglomeration of the rubber into separable particles is materially facilitated. The rubber is, moreover, extracted free or substantially so from the objectionable and harmful constituents ordinarily milled into the rubber during its extraction from the shrub, but which, during the retting process, are rendered water soluble and are extracted during the milling operation.

The mill water will contain the extracted water soluble constituents, including those produced by the retting process. By concentrating this solution, a concentrated solution, or a solid material, can be produced suitable for use for various purposes. It contains valuable tanning, adhesive and other constituents.

The rubber thus recovered, after the milling operation, may be subjected to further purification to free it from adhering bark, etc. according to procedure now commonly used for the similar treatment of rubber worms produced by present day processes. After purification, the rubber can be worked into sheets on sheeting rolls, well washed and dried.

The rubber product thus produced is a new and improved guayule rubber product, of improved quality and composition. It has a greatly reduced acetone extract which in particular is reduced by the elimination of the objectionable constituents commonly incorporated in considerable amounts in guayule rubber by present day milling methods. The acetone extract may thus be reduced to as little as half or less of that commonly met with in commercial guayule rubber which contains around 25% or more of acetone-extractable material. The rubber, moreover, has radically improved properties which are reflected in its radically increased tensile strength after vulcanization.

The nature and advantages of the invention will be further illustrated by the following specific examples:

*Example 1.*—A lot of guayule shrub gathered without sunning was treated six days after gathering, and while it was still quite lush, as follows. The bales of shrub were first opened and the material thoroughly mixed to insure uniformity throughout the test. The material was then divided into equal pebble mill charges which were treated respectively as follows:

*No. 1.*—Crushed and milled immediately in the usual way, under standard milling conditions, to serve as a control.

*No. 2.*—Shrub chopped to allow access of water, spread on the floor four days and watered daily during this time to keep the shrub moist, thereafter crushed and milled as in No. 1.

*No. 3.*—Stored for nine days in a dark, cool warehouse and thereafter crushed and milled as in No. 1 to serve as a control for tests Nos. 4 and 5.

*No. 4.*—Stored for nine days as in No. 3, thereafter crushed and spread on the floor and watered daily for fifteen days, then crushed and milled as in No. 1 and No. 3.

*No. 5.*—Stored for nine days as in Nos. 3 and 4, thereafter the shrub was dipped in hot water at 90° C. for ten minutes to insure complete coagulation of the rubber and thorough saturation with water, thereafter drained overnight, then crushed and spread on the floor for fifteen days before milling.

The rubber resulting from these different methods of treatment of the same shrub was subjected to vulcanization using a standard formula, and the cure carried out at 45 pounds steam pressure to obtain the optimum cure.

The standard formula used in this and the following examples contained 100 parts of rubber, 8 parts zinc oxide, 6 parts sulfur, 1.5 parts stearic acid and 0.5 part diphenylguanidine.

The tensile strength and elongation of the respective rubber products are given in the following tables, together with the yield of recoverable rubber and the acetone extract of the rubber in each case:

| Shrub treatment | Tensile at break lbs. sq. in. | Elongation | Pebble mill extraction of rubber on bone dry basis | Acetone extract of the rubber |
|---|---|---|---|---|
| | | *Percent* | *Percent* | *Percent* |
| No. 1. Control, crushed and milled immediately | 2150 | 840 | 12.2 | 32.0 |
| No. 2. Chopped and spread on floor 4 days, wetted daily | 2390 | 800 | 11.8 | 22.4 |
| No. 3. Stored 9 days, then crushed and milled | 2130 | 890 | 11.1 | 30.9 |
| No. 4. Stored 9 days, then crushed and spread on floor and watered 15 days | 3090 | 860 | 12.2 | 12.5 |
| No. 5. Stored 9 days, dipped in hot water, drained, crushed and spread on floor 15 days before milling | 3180 | 825 | 13.8 | 10.9 |

The second lot of shrub which was subjected to retting for only four days had not undergone sufficient change to show the full advantages of the retting process. Lots Nos. 4 and 5 showed enormous improvement in physical quality of the vulcanized rubber resulting from the retting of the shrub prior to milling out the rubber; and also a great reduction of the acetone-soluble constituents in the resulting rubber. In the fifth lot the coagulation of the rubber was completed by the heating of the retting shrub in hot water and the increased yield of extracted rubber reflects its increased coagulation. The acetone extract from the rubber of lot No. 5 was less than one-third of that of the control.

*Example 2.*—Another lot of green shrub, collected without sunning and drying, arrived at the factory six days after gathering, was thoroughly mixed and divided into pebble mill charges which were treated as shown in the following table, with the result indicated:

| Time of storage before crushing and retting | Time of "retting" crushed wet on the floor | Tensile at break "optimum cure" lbs. sq. in. | Modulus tensile-product divided by 10,000 | Pebble mill extraction of rubber on dry basis | Acetone extract of rubber |
|---|---|---|---|---|---|
| | | | | *Percent* | *Percent* |
| Control, crushed and milled at once | None | 2160 | 159 | 10.0 | 28.2 |
| Crushed at once | 4 days | 2640 | 210 | 10.7 | 18.5 |
| Crushed at once | 7 days | 2800 | 221 | 10.8 | 16.0 |
| Crushed at once | 13 days | 3200 | 250 | 10.6 | 13.3 |
| Crushed at once | 20 days | 3300 | 258 | 10.9 | 11.5 |
| Crushed at once | 30 days | 2860 | 219 | 11.6 | 10.0 |
| 7 days | 7 days | 2640 | 228 | 11.1 | 20.2 |
| 7 days | 21 days | 2820 | 230 | 10.9 | 18.8 |
| 14 days | 7 days | 2820 | 237 | 12.1 | 17.3 |
| 14 days | 15 days | 2800 | 234 | 12.9 | 15.6 |
| 28 days | 7 days | 2880 | 228 | 13.7 | 14.0 |
| 28 days | 15 days | 2830 | 232 | 15.0 | 11.2 |
| 35 days | 7 days | 2800 | 228 | 14.3 | 14.7 |
| 35 days | 15 days | 2750 | 236 | 14.4 | 11.3 |

These tests show the improvements in quality of extractable rubber and in the yield of the same brought about by the retting process of the present invention applied to green shrub before milling. The general improvement in tensile strength, reduction in acetone extract, and increase in yield of recoverable rubber, is progressive up to a certain point and then ceases or begins to decline as far as the tensile strength and yield are concerned.

*Example 3.*—Another lot of shrub, sunned five days after gathering, and thirty-three days old when crushed, was crushed in the presence of water, and the shrub was thoroughly mixed after crushing to insure uniformity of the mixture. To serve as a control, a pebble mill charge was run immediately after crushing; part of the crushed material was spread on the mill floor, sprinkled with water daily until milled; and another portion of the crushed material was stored packed tightly in silos until removed for milling. The results obtained are shown in the following table:

| Treatment | Tensile at break "optimum cure" lbs. sq. in. | Modulus | Pebble mill extraction of rubber on dry basis | Acetone extract of rubber |
|---|---|---|---|---|
| | | | Percent | Percent |
| (1) Control, milled at once | 2080 | 211 | 11.5 | 15.7 |
| (2) Crushed, retted on floor 6 days | 2840 | 234 | 11.3 | 11.2 |
| (3) Retted on floor 12 days | 2910 | 242 | 12.2 | 9.8 |
| (4) Stored in silo (crushed wet) 7 days | 2720 | 226 | 10.8 | 14.4 |
| (5) Stored in silo, 12 days | 2830 | 235 | 12.5 | |

*Example 4.*—Another lot of shrub, sunned six days in the field after gathering, and forty days out of the ground and therefore very dry when received for treatment, was crushed with excess water containing para-amido-dimethyl-aniline equal in weight to one part in 500 parts of bone dry shrub. One pebble mill charge was run immediately after crushing as a control. Other charges were run after various periods of retting of the crushed material, left moist with additional water on the floor for the periods and with the results indicated in the following table:

| Time of retting | Tensile at break "optimum cure" lbs. sq. in. | Modulus tensile product divided by 10,000 | Pebble mill extraction of rubber on dry basis | Acetone extract of rubber |
|---|---|---|---|---|
| | | | Percent | Percent |
| Control, milled immediately without retting | 2000 | 163 | 14.6 | 21.2 |
| Retted on floor 6 days before milling | 2490 | 206 | 14.9 | 14.4 |
| Retted on floor 10 days before milling | 2840 | 232 | 15.6 | 11.8 |

These examples illustrate the remarkable simplicity of the process and the far-reaching improvements which are brought about in the resulting rubber product. These examples are illustrative of the invention. Variations and modifications can be made in the details of the process, as will be readily understood. As the shrub is being subjected to the retting treatment, it is possible to follow the course of the treatment by tests from day to day, milling out and testing a part of the rubber, and in this way controlling the process so that it may be stopped at any desired point and to produce products of different degrees of quality and purity, as illustrated by the above examples.

From the above examples, it will be seen that the products produced by the retting process and by subsequent milling have a radically reduced acetone extract, and the constituents extractable with acetone differ radically from the constituents extractable from ordinary guayule rubber. In particular, the new rubber is free from objectionable organic constituents, probably of a carbohydrate character, which are harmful in the process of vulcanization.

The present process moreover, enables substantially the maximum yield of rubber to be obtained from the shrub treated and a rubber comparable in its properties with plantation rubber, and in some respects superior thereto.

While the process enables the acetone extract to be greatly reduced and the physical properties to be greatly improved, by the same operation, when carried out under properly regulated conditions on shrub containing undeteriorated rubber, yet in some cases one or the other of these improvements can be obtained without corresponding improvement of the other, e.g. in case the putrefactive decomposition is stimulated and promoted during the early stages of the process.

Furthermore, by proper control and regulation of the process, products of varying and regulated properties and composition can be obtained.

While I have described the invention in connection with the treatment of guayule shrub and the production of rubber and other products therefrom, it can also be applied to other rubber-containing shrubs, which similarly undergo a retting process, for the extraction of rubber, etc. therefrom.

I claim:—

1. The improvement in the extraction of rubber from guayule shrub which comprises treating the shrub with a preservative agent to preserve the rubber therein against deterioration, subjecting the shrub containing such agent to a retting and coagulating treatment, and extracting the rubber from the retted shrub.

2. The improvement in the mechanical extraction of rubber from guayule shrub which comprises maintaining the shrub, after harvesting and before milling, in a wet condition, supplying water as needed to maintain the shrub in a wet condition, subjecting the shrub at the same time to air so that air comes in contact with the shrub in its wet condition, regulating the wet condition of the shrub with excess of air thereto and continuing such treatment under regulated conditions to effect far-reaching changes in the shrub, due to natural agencies, such that a large part of the organic matter present in the shrub in a water insoluble condition is converted into a water soluble condition and in particular to decompose and render water soluble a substantial amount of the normally water insoluble constituents of the shrub which would otherwise be milled from the shrub with the rubber as acetone-soluble constituents of the rubber, and subjecting the resulting shrub to a milling operation in the presence of water to effect extraction of water soluble constituents and agglomeration of the rubber into a rubber product of improved properties and of low acetone-soluble content.

3. The improvement in the mechanical extraction of rubber from guayule shrub which comprises crushing the shrub, maintaining the crushed shrub in a wet condition, supplying water as needed to maintain the shrub in a wet condition, maintaining the shrub with excess of air so that air comes in contact with the shrub in its wet condition, regulating the wet condition of the shrub with excess of air thereto and continuing such treatment under regulated conditions for a sufficient time to effect far-reaching changes in the shrub, due to natural agencies, such that a large part of the organic matter present in the shrub in a water insoluble condition is converted into a water soluble condition and in particular to decompose and render water soluble a substantial amount of the normally water-insoluble constituents of the shrub which would otherwise be milled from the shrub with the rubber as acetone-soluble constituents of the rubber, and subjecting the resulting shrub to a milling operation in the presence of water to effect extraction of water soluble constituents and agglomeration of the rubber into a rubber product of improved properties and of low acetone-soluble content.

4. The improvement in the mechanical extraction of rubber from guayule shrub which comprises maintaining the shrub after harvesting and before milling in a wet condition for a period of several days, moistening the shrub from time to time during such period to maintain it in a regulated moist condition, subjecting the shrub at the same time to air so that air comes in contact with the shrub in its regulated wet condition, regulating the wet condition of the shrub and continuing such treatment under such regulated conditions until far-reaching changes are effected in the shrub, due to natural agencies, such that a large part of the organic matter present in the shrub in a water insoluble condition is converted into a water soluble condition and in particular to decompose and render water soluble a substantial amount of the normally water-insoluble constituents of the shrub which would otherwise be milled from the shrub with the rubber as acetone-soluble constituents of the rubber, and subjecting the resulting shrub to a milling operation in the presence of water to effect extraction of water soluble constituents and agglomeration of the rubber into a rubber product of improved properties and of low acetone-soluble content.

5. An improved guayule rubber product extracted from retted guayule shrub in which a large proportion of the normally water-insoluble constituents have been rendered water soluble by the retting treatment and are removed from the shrub prior to or during the mechanical extraction of the rubber therefrom, said rubber having an acetone extract substantially less than 20% and containing a low content of acetone-soluble and benzol-insoluble constituents normally present in guayule rubber extracted from unretted shrub, said rubber being comparable with high grade rubber and showing a tensile strength after vulcanization in excess of 2,500 pounds per square inch, said rubber forming a valuable commercial substitute for plantation rubber.

6. An improved guayule rubber product extracted from retted guayule shrub in which a large proportion of the normally water-insoluble constituents have been rendered water soluble by the retting treatment and are removed from the shrub prior to or during the mechanical extraction of the rubber therefrom, said rubber having an acetone extract substantially less than 20% and containing a low content of acetone-soluble and benzol-insoluble constituents normally present in guayule rubber extracted from unretted shrub, said rubber being comparable with high-grade rubber and showing a tensile strength after vulcanization in excess of 3,000 pounds per square inch, said rubber forming a valuable commercial substitute for plantation rubber.

DAVID SPENCE.